(12) United States Patent
Ray et al.

(10) Patent No.: US 11,906,867 B2
(45) Date of Patent: Feb. 20, 2024

(54) ELECTROCHEMICAL DEVICES AND METHODS OF FORMING SAME

(71) Applicant: SAGE ELECTROCHROMICS, INC., Faribault, MN (US)

(72) Inventors: Hannah Leung Ray, Alameda, CA (US); Ruth Anne Sarah Schlitz, Lakeville, MN (US); Yi Jiang, Shrewsbury, MA (US); Camille Mesnager, Toulouse (FR); Wen Li, Lakeville, MN (US); Carlijn L. Mulder, Minneapolis, MN (US); Jean-Christophe Giron, Edina, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 17/570,559

(22) Filed: Jan. 7, 2022

(65) Prior Publication Data

US 2022/0128879 A1 Apr. 28, 2022

Related U.S. Application Data

(63) Continuation of application No. 16/528,366, filed on Jul. 31, 2019, now Pat. No. 11,249,366.

(60) Provisional application No. 62/713,361, filed on Aug. 1, 2018, provisional application No. 62/712,835, filed on Jul. 31, 2018.

(51) Int. Cl.
*G02F 1/1523* (2019.01)
*G02F 1/163* (2006.01)
*G02F 1/155* (2006.01)
*G02F 1/153* (2006.01)

(52) U.S. Cl.
CPC ............ *G02F 1/1525* (2013.01); *G02F 1/155* (2013.01); *G02F 1/1533* (2013.01); *G02F 1/163* (2013.01)

(58) Field of Classification Search
CPC ...... G02F 1/1525; G02F 1/1533; G02F 1/155; G02F 1/163; G02F 1/1524
USPC ............................ 359/265–275; 345/105, 49
See application file for complete search history.

(56) References Cited

U.S. PATENT DOCUMENTS

| | | | |
|---|---|---|---|
| 5,694,144 A * | 12/1997 | Lefrou | G02F 1/163 359/275 |
| 8,228,592 B2 | 7/2012 | Wang et al. | |
| 8,582,193 B2 | 11/2013 | Wang et al. | |

(Continued)

FOREIGN PATENT DOCUMENTS

| | | |
|---|---|---|
| CN | 105511192 A | 4/2016 |
| JP | 2015520911 A | 7/2015 |
| KR | 100779245 B1 | 11/2007 |

OTHER PUBLICATIONS

International Search Report and Written Opinion for PCT/US2019/044529, dated Nov. 15, 2019, 11 pages.

(Continued)

*Primary Examiner* — Tuyen Tra
(74) *Attorney, Agent, or Firm* — Abel Schillinger, LLP; Robert N Young

(57) ABSTRACT

An electrochemical device is disclosed. The electrochemical device includes a first transparent conductive layer, an electrochromic layer overlying the first transparent conductive layer, a counter electrode layer overlying the electrochromic layer, a second transparent conductive layer, and a switching speed parameter of not greater than 0.68 s/mm at 23° C.

18 Claims, 13 Drawing Sheets

(56) References Cited

U.S. PATENT DOCUMENTS

| | | |
|---|---|---|
| 8,717,658 B2 | 5/2014 | Bergh et al. |
| 8,749,868 B2 | 6/2014 | Wang et al. |
| 8,758,575 B2 | 7/2014 | Wang et al. |
| 9,140,951 B2 | 9/2015 | Wang et al. |
| 9,164,346 B2 | 10/2015 | Wang et al. |
| 9,261,751 B2 | 2/2016 | Pradhan et al. |
| 9,581,875 B2 | 2/2017 | Burdis et al. |
| 9,798,213 B2 * | 10/2017 | Kubo ................... G02F 1/1503 |
| 10,761,394 B2 * | 9/2020 | Choi ...................... B05D 1/005 |
| 2010/0007937 A1 | 1/2010 | Widjaja et al. |
| 2010/0165440 A1 | 7/2010 | Nguyen et al. |
| 2013/0280581 A1 | 10/2013 | Sun et al. |
| 2014/0016173 A1 | 1/2014 | Gillaspie et al. |
| 2016/0011480 A1 | 1/2016 | Pradhan et al. |
| 2017/0279155 A1 | 9/2017 | Sun et al. |
| 2018/0052374 A1 | 2/2018 | Wang et al. |

OTHER PUBLICATIONS

Dynamic Insulating Glass Unit (IGU), View Dynamic Glass Data Sheet, 2018, 4 pages.

* cited by examiner

ELECTROCHEMICAL DEVICES AND METHODS OF FORMING SAME

CROSS-REFERENCE TO RELATED APPLICATIONS

This application is a continuation of and claims priority under 35 U.S.C. 120 to U.S. patent application Ser. No. 16/528,366, entitled "ELECTROCHEMICAL DEVICES AND METHODS OF FORMING SAME," by Hannah Leung Ray et al., filed Jul. 31, 2019, which application claims priority under 35 U.S.C. § 119(e) to U.S. Patent Application No. 62/712,835, entitled "ELECTROCHEMICAL DEVICES AND METHODS OF FORMING SAME," by Hannah Leung Ray et al., filed Jul. 31, 2018, and U.S. Patent Application No. 62/713,361, entitled "ELECTROCHEMICAL DEVICES AND METHODS OF FORMING SAME," by Hannah Leung Ray et al., filed Aug. 1, 2018, all of which are assigned to the current assignee hereof and incorporated herein by reference in their entireties.

FIELD OF THE DISCLOSUE

The present disclosure is related to electrochemical devices and method of forming the same.

BACKGROUND

An electrochemical device can include an electrochromic stack where transparent conductive layers are used to provide electrical connections for the operation of the stack. Electrochromic (EC) devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

EC devices have a composite structure through which the transmittance of light can be modulated. FIG. 1 illustrates a typical layer solid-state electrochromic device in cross-section having the following superimposed layers: a first transparent conductive layer ("TCL") 11 which serves to apply an electrical potential to the electrochromic device, an electrochromic electrode layer ("EC") 14 which produces a change in absorption or reflection upon oxidation or reduction, an ion conductor layer ("IC") 13 which functionally replaces an electrolyte, allowing the passage of ions while blocking electronic current; a counter electrode layer ("CE") 12 which serves as a storage layer for ions when the device is in the bleached or clear state; and a second transparent conductive layers 15. Each of the aforementioned layers is typically applied sequentially on a substrate 16.

However, further improvements are sought in the context of electrochromic devices.

Figure 1:
FIG. 1 is a schematic cross-section of a typical electrochromic device.

Skilled artisans appreciate that elements in the figures are illustrated for simplicity and clarity and have not necessarily been drawn to scale. For example, the dimensions of some of the elements in the figures may be exaggerated relative to other elements to help to improve understanding of implementations of the invention.

DETAILED DESCRIPTION

The following description in combination with the figures is provided to assist in understanding the teachings disclosed herein. The following discussion will focus on specific implementations and implementations of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Patterned features, which include bus bars, holes, holes, etc., can have a width, a depth or a thickness, and a length, wherein the length is greater than the width and the depth or thickness. As used in this specification, a diameter is a width for a circle, and a minor axis is a width for an ellipse.

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated.

"Tinted transmission parameter" is a measurement the percentage of variable light transmission device through an insulated glass unit stabilized at a tinted state measured by a camera/backlight apparatus. The camera and backlight are set up in the following steps. The camera gain and exposure are adjusted such a plain backlight has the brightest pixels with 22% of full scale. The camera is set with no corrections of any kind. The camera is focused on the backlight. White balance numbers from the camera drivers are recorded. The camera records an image with the backlight off as the "dark reference." The dark reference defines 0% T for each pixel. The camera records an image with the backlight on, exposed, and stable as the "bright reference." The bright reference defines 100% T for each pixel. The camera is color calibrated in the following steps. 1. Perform dark and bright reference as given above. 2. Use 12 different color standards to calibrate each tester. Each color standard consists of two 20"×20" colored films purchased from Gam Products, Inc. The chart below gives the specific color and product number for the colored sheets. The two films are placed in a metal frame. Each of the 12 standards are first measured in the equipment HunterLab Colorquest XE, calibrated according to the manufacturer's standards, and recording data using the Universal software—obtaining the values L*,a*,b*. The 12 color standard films are then placed on the (exposed, stable) backlight in the orientation noted in the chart. All other light is blacked out. The area of the image with the color standard is selected in the software and the RGB colors recorded by the camera are noted as in the example below.

| | Standards | | | | |
|---|---|---|---|---|---|
| ←Toward Back Light | | R | G | B | Weight |
| Tan (435) | Clear | 0.91 | 0.826 | 0.713 | 1 |
| Tan (435) | Tan (435) | 0.892 | 0.743 | 0.574 | 9 |
| 0.15 ND | New Green (520) | 0.559 | 0.577 | 0.41 | 9 |
| 0.3 ND | Blue (785) | 0.222 | 0.357 | 0.486 | 1 |
| 1.2 ND | Clear | 0.07 | 0.058 | 0.086 | 1 |
| 1.2 ND | Blue (785) | 0.031 | 0.047 | 0.083 | 5 |
| 1.2 ND | 0.3 ND | 0.41 | 0.034 | 0.053 | 1 |
| New Green (520) | Yellow (440) | 0.818 | 0.842 | 0.423 | 1 |
| Old Green (540) | Clear | 0.89 | 0.911 | 0.788 | 1 |
| Yellow (440) | Clear | 0.912 | 0.878 | 0.663 | 3 |
| Yellow (440) | Old Green (540) | 0.87 | 0.849 | 0.575 | 1 |
| Yellow (440) | Yellow (440) | 0.894 | 0.835 | 0.48 | 5 |

Using L*a*b* color coordinates of standards, find optimum 3×3 matrix to multiply by the camera's measured [R G B] vector to convert it to an accurate [L*a*b*] vector. Start with a 3×3 matrix, [(0.3, 0.3, 0.3) (0.3, 0.3, 0.3) (0.3, 0.3, 0.3)] and multiply this by the measured [R G B] vector measured for each standard. This gives an initial calculated XYZ vector. Convert XYZ to Calculated L*a*b* by using the formulas:

$$L^* = 116 f\left(\frac{Y}{Y_n}\right) - 16$$

$$a^* = 500\left(f\left(\frac{X}{X_n}\right) - f\left(\frac{Y}{Y_n}\right)\right)$$

$$b^* = 200\left(f\left(\frac{Y}{Y_n}\right) - f\left(\frac{Z}{Z_n}\right)\right)$$

Where $f(t)=t^{(1/3)}$

Where $X_n=94.8110$, $Y_n=100$, $Z_n=107.304$ for the selected illuminant D65 CIE 1964 (10 deg).

Subtract the calculated L*a*b* values from the measured L*a*b* values from Hunterlab to get the delta, then square the delta to get the error in camera measurement for each calculated value L*a*b* for each standard. For each standard: Sum the squared deltas, and multiply them by the weighting value and name them E1, E2, . . . E12. Take the square root of the sum of E1, E2, . . . E12 to calculate Overall Error. Use the Solver function in Excel to solve the matrix such that the Overall Error is minimized. Multiplying measured R G B values for each standard will give you the most accurate calculated L*a*b* values. Enter the matrix into the software so that the matrix multiplies the measured RGB values. The software will then use this matrix for all future measurements to convert RGB to XYZ, and then to L*a*b* values. After doing this color calibration, to convert L* to % T: Take three neutral density (ND) filter calibration standards on glass, (2.2 mm thick glass, 225×662 mm rectangular area covered with neutral density filter with the following % T: 67% T, 45% T, 10% T) and measure HunterLab % T values. Put them on the backlight and cover up all other light. Take an image of the neutral density filters using the camera and record the L*a*b* values measured by the camera (corrected by the matrix as above). The software will compute % T from the equation: % T/100=[(L*−16)/116]^3. To match the measured camera % T measurement with the actual Hunterlab % T measurement for the 3 ND filters: Start with 1:1 Hunterlab % T/camera % T ratio, and adjust the multiplier to 1:1.01, 1:1.02, etc. until the difference between each calculated % T value for the ND filters from the camera is within 0.5 percentage points of the ND filter calibration standards' % T Hunterlab measurement. Enter the multiplier into the software. From this point on, the software will adjust the measured RGB to an accurate L*a*b* and % T measurement for EACH pixel in the image. Each pixel will be assigned a0%-100% % T value by calculating (on a pixel-by-pixel basis) the following: [current reading−dark reference]/[bright reference−dark reference].

"Switching speed parameter" is a measurement of time in seconds/mm from the time 3V is applied to an electrochemical device to reach the calculated average of UT % T=5% visible light transmission from a bleached state (−2V) in a dark room with a backlight measured by an RGB camera. The camera and backlight are set up according the procedure described above with respect to the tinted transmission parameter. After the color calibration is completed, the average UT % T is calculated by first calculating the % T for each pixel of the electrochemical device and then calculating the average % T of all the pixels in the electrochemical device collectively.

"Impedance parameter" is a measurement the effective resistance—a combined effect of ohmic resistance and electrochemical reactance—of an electrochemical device measured at 2 log (freq/Hz) on a 5×5 cm device with DC bias at −20° C. as 5 mV to 50 mV is applied to the device. The resultant current is measured and impedance and phase angle are computed at each frequency in the range of 100 MHz to 6 MHz.

Figure 11:
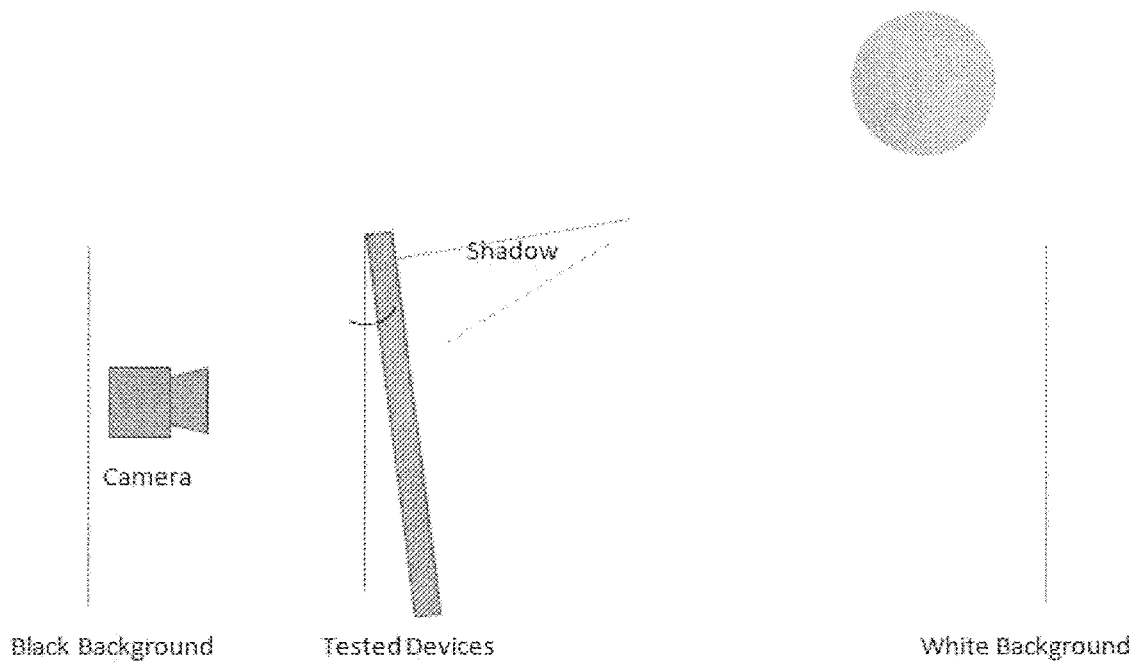
FIG. 11 is a schematic graph of the apparatus used for FIG. 10.

"Shadowing parameter" is a measurement of the difference in brightness at a time of 8 minutes between an area of a device exposed to the sun and an area of the device within a shadow as −2V is applied to the device. 3V is applied to all three devices at time zero minutes. The devices, S1 and S2, are 40 mm×60 mm devices. The device, S3 is a 22.5 inch×59.5 inch device. The measurement was taken using a camera calibrated as described above. The camera is set such that there is no modulation of the image (no auto-focus, no auto-brightness/contrast), and a pixel brightness of 75% of saturation. The camera is fixed in place 200 cm from the back of the devices, 100 cm height from the ground, set such that the image captured through the devices contains the white background only and focused on the plane of the device. The measurements were taken at an ambient temperature of 80F, 93,000 lux measured at face of devices. The device faced 267.5 degrees clockwise from the north and 29.94 degrees up from horizon. Tested devices are angled 7 degrees from normal (See curve in FIG. 11). The devices are oriented so that their face is perpendicular to path of sun measured horizontally. Distance from Black Background to Tested Devices is 240 cm. Distance from White Background to Tested Devices is 220 cm. Black and White backgrounds are normal to horizontal. Area of black and White backgrounds are Equal or larger than the area of the devices. Shadow caster is matte black and 44 cm long (in the direction perpendicular to the devices). It is oriented normal to the face of the devices (normal to the 7 degree tilt). Bottom of shadow caster is positioned flush with the top of the devices being tested. Shadow caster is 10% longer on each side of the devices being tested to ensure that there are no unshadowed areas on the face of the device, here it was 300 cm long. Devices are tinted and exposed to the sun for 1 hour. The camera took a picture each 4 seconds for 30 minutes. Image data processing: for each frame (a) Select the region of interest (ROI) (shadow and sun part)—these regions are a box 10×10 pixels—Pixels chosen in an area of each device that shows the white background, (b) Convert RGB to LAB as described above (c) Calculate L* mean for each ROI as described above (d) Average the L* for the 10×10 pixel box and (e) Take the difference vs. time between L* sun and L* shadow.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

Figure 2:
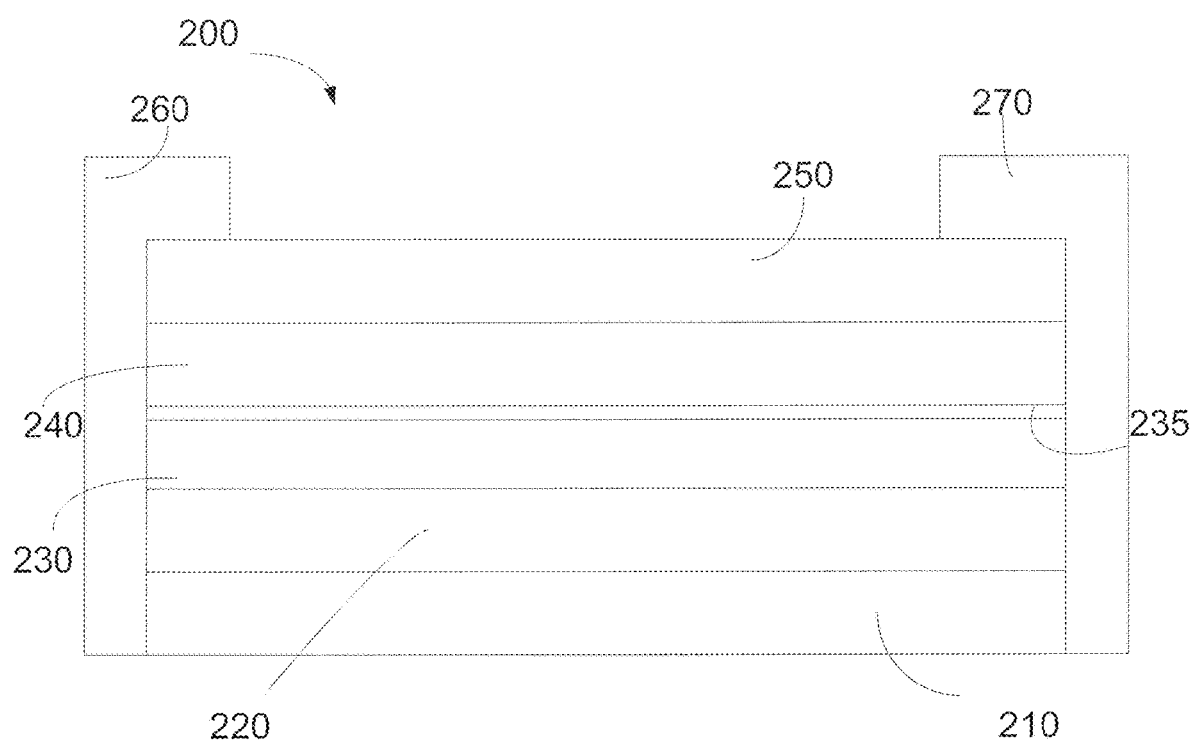
FIG. 2 is a schematic cross-section of an electrochromic device with an improved film structure in accordance with an implementation of the present disclosure.

In accordance with the present disclosure, FIG. 2 illustrates a cross-section view of a partially fabricated electrochemical device 200 having an improved film structure. For purposes of illustrative clarity, the electrochemical device 200 is a variable transmission device. In one embodiment, the electrochemical device 200 can be an electrochromic device. In another embodiment, the electrochemical device 200 can be a thin-film battery. However, it will be recognized that the present disclosure is similarly applicable to other types of scribed electroactive devices, electrochemical devices, as well as other electrochromic devices with different stacks or film structures (e.g., additional layers). With regard to the electrochemical device 200 of FIG. 2, the device 200 may include a substrate 210, a first transparent conductor layer 220, a cathodic electrochemical layer 230, an anodic electrochemical layer 240, and a second transparent conductor layer 250.

In an implementation, the substrate 210 can include a glass substrate, a sapphire substrate, an aluminum oxynitride substrate, or a spinel substrate. In another implementation, the substrate 210 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 210 may or may not be flexible. In a particular implementation, the substrate 210 can be float glass or a borosilicate glass and have a thickness in a range of 0.5 mm to 12 mm thick. The substrate 210 may have a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm. In another particular implementation, the substrate 210 can include ultra-thin glass that is a mineral glass having a thickness in a range of 50 microns to 300 microns. In a particular implementation, the substrate 210 may be used for many different electrochemical devices being formed and may be referred to as a motherboard.

Transparent conductive layers 220 and 250 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another implementation, the transparent conductive layers 220 and 250 can include gold, silver, copper, nickel, aluminum, or any combination thereof. The transparent conductive layers 220 and 250 can include indium oxide, indium tin oxide, doped indium oxide, tin oxide, doped tin oxide, zinc oxide, doped zinc oxide, ruthenium oxide, doped ruthenium oxide and any combination thereof. The transparent conductive layers 220 and 250 can have the same or different compositions. The transparent conductive layers 220 and 250 can have a thickness between 10 nm and 600 nm. In one implementation, the transparent conductive layers 220 and 250 can have a thickness between 200 nm and 500 nm. In one implementation, the transparent conductive layers 220 and 250 can have a thickness between 320 nm and 460 nm. In one implementation the first transparent conductive layer 220 can have a thickness between 10 nm and 600 nm. In one implementation, the second transparent conductive layer 600 can have a thickness between 80 nm and 600 nm.

The layers 230 and 240 can be electrode layers, wherein one of the layers may be a cathodic electrochemical layer, and the other of the layers may be an anodic electrochromic layer (also referred to as a counter electrode layer). In one embodiment, the cathodic electrochemical layer 230 is an electrochromic layer. The cathodic electrochemical layer 230 can include an inorganic metal oxide material, such as $WO_3$, $V_2O_5$, $MoO_3$, $Nb_2O_5$, $TiO_2$, $CuO$, $Ni_2O_3$, $NiO$, $Ir_2O_3$, $Cr_2O_3$, $Co_2O_3$, $Mn_2O_3$, mixed oxides (e.g., W—Mo oxide, W—V oxide), or any combination thereof and can have a thickness in a range of 40 nm to 600 nm. In one implementation, the cathodic electrochemical layer 230 can have a thickness between 100 nm to 400 nm. In one implementation, the cathodic electrochemical layer 230 can have a thickness between 350 nm to 390 nm. The cathodic electrochemical layer 230 can include lithium, aluminum, zirconium, phosphorus, nitrogen, fluorine, chlorine, bromine, iodine, astatine, boron; a borate with or without lithium; a tantalum oxide with or without lithium; a lanthanide-based material with or without lithium; another lithium-based ceramic material; or any combination thereof.

The anodic electrochromic layer 240 can include any of the materials listed with respect to the cathodic electrochromic layer 230 or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 40 nm to 500 nm. In one implementation, the anodic electrochromic layer 240 can have a thickness between 150 nm to 300 nm. In one implementation, the anodic electrochromic layer 240 can have a thickness between 250 nm to 290 nm. In some implementations, lithium may be inserted into at least one of the first electrode 230 or second electrode 240.

In one implementation, the device 200 may include metallic oxide film 235 between the two electrode layers 230 and 240. The metallic oxide film 235 may have a thickness of no greater than 10 nm, such as no greater than 5 nm, no greater than 4 nm, no greater than 3 nm, no greater than 2 nm, or no greater than 1 nm. In another embodiment, the metallic oxide film 235 may have a thickness greater than 0, such as greater than 0.1 nm, greater than 0.2 nm, greater than 0.5 nm, or greater than 0.8 nm. The metallic oxide film 235 may include lithium, sodium, oxidized lithium, $Li_2WO_4$, tungsten, nickel, lithium carbonate, lithium hydroxide, lithium peroxide, or combinations thereof. In one implementation, the metallic oxide film 235 does not include a polymer. In one implementation, first transparent conductive layer 220 does not include a polymer. In one implementation, second transparent conductive layer 250 does not include a polymer. In one implementation, the cathodic electrochemical layer 230 does not include a polymer. In one implementation, the anodic electrochemical layer 240 does not include a polymer. In another implementation, wherein none of the first transparent conductive layer 220, the cathodic electrochemical layer 230, the anodic electrochemical layer 240, the second transparent conductive layer 250, and the metallic oxide film comprise a polymer 235. In one implementation, the metallic oxide film 235 can be oxidized.

In another implementation, the device 200 may include a plurality of layers between the substrate 210 and the first transparent conductive layer 220. In one implementation, an antireflection layer is between the substrate 210 and the first transparent conductive layer 220. The antireflection layer can include $SiO_2$, $NbO_2$, and can be a thickness between 20 nm to 100 nm. The device 200 may include at least two bus bars. In the implementation of FIG. 2, two bus bars 260, 270 are shown. The bus bar 260 can be electrically connected to the first transparent conductive layer 220 and the bus bar 270 can be electrically connected to the second transparent conductive layer 250.

Figure 3:
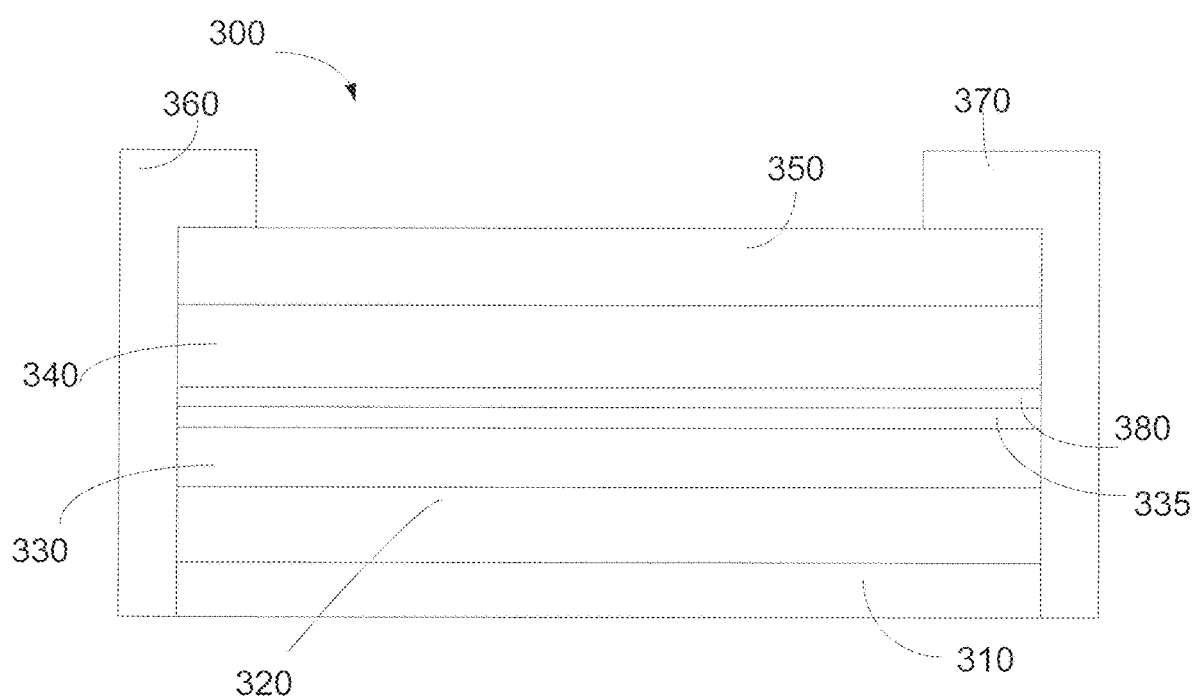
FIG. 3 is a schematic cross-section of an electrochemical device with an improved film structure in accordance with another implementation of the present disclosure.

FIG. 3 is a schematic cross-section of an electrochemical device 300 with an improved film structure in accordance with another implementation of the present disclosure. The electrochemical device 300 can be an electrochromic device. The electrochemical device 300 can be similar to the electrochemical device 200. The electrochemical device 300 can include a substrate 310, a first transparent conductive layer 320, a cathodic electrochemical layer 330, a metallic oxide film 335, a layer 380, an anodic electrochemical layer 340, a second transparent conductive layer 350, a first bus bar 360, and a second bus bar 370. In one implementation, the layer 380 can be a metal oxynitride (MOxNy)—where M is a metal, x is between 0.1-6, and y is between 0.1-6. In an alternative implementation, the layer 380 can be a SiOx:Al layer.

The first transparent conductive layer 320 can be between the substrate 310 and the cathodic electrochemical layer 330. In one implementation, the first transparent conductive layer 320 includes a P1 gap to prevent an electrical short of the electrochemical device 300. In one implementation, the first transparent conductive layer 320 is electrically isolated from the second transparent conductive layer 370 through the P1 gap. In one implementation, the first transparent conductive layer 320 is electrically connected to the first transparent conductive layer 360. In one implementation, the metallic oxide film 335 can be between the cathodic electrochemical layer 330 and the anodic electrochemical layer 340. In one implementation the metallic oxide film 335 can be on the cathodic electrochemical layer 330. In one implementation, the metallic oxide film 335 can be on the layer 380.

In another implementation the layer 380 can be between the cathodic electrochemical layer 330 and the anodic electrochemical layer 340. In one implementation, the layer 380 can be on the cathodic electrochemical layer 330. In one implementation, the layer 380 can be on the metallic oxide film 335. In yet another implementation, the layer 380 can be on the anodic electrochemical layer 340. The layer 380 can include silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, other lithium-based ceramic materials, lithium salts, and dopants including lithium, sodium, hydrogen, deuterium, potassium, calcium, barium, strontium, magnesium, or combinations thereof. In one implementation, the layer 380 can have a thickness between 0.5 nm and 11 nm. In one implementation, the layer 380 can have a thickness no greater than 10 nm, such as 5 nm, no greater than as 4 nm, no greater than 3 nm, no greater than 2 nm, or no greater than 1 nm.

The anodic electrochemical layer 340 can be between the second transparent conductive layer 350 and the cathodic electrochemical layer 330. In one implementation, the second transparent conductive layer 350 can be on the anodic electrochemical layer 340. In one implementation, the anodic electrochemical layer 340 can be on the layer 380. In another implementation, the anodic electrochemical layer 340 can be on the metallic oxide film 335.

In another implementation, the electrochemical devices 200 and 300 may include additional layers. In one embodiment, a sealing layer including a silica oxide may be deposited on the anodic electrochemical layer.

Figure 4A:
FIGS. 4A-4E are schematic cross-sections of an electrochemical at various stages of manufacturing in accordance with an implementation of the present disclosure.
Figure 4B:
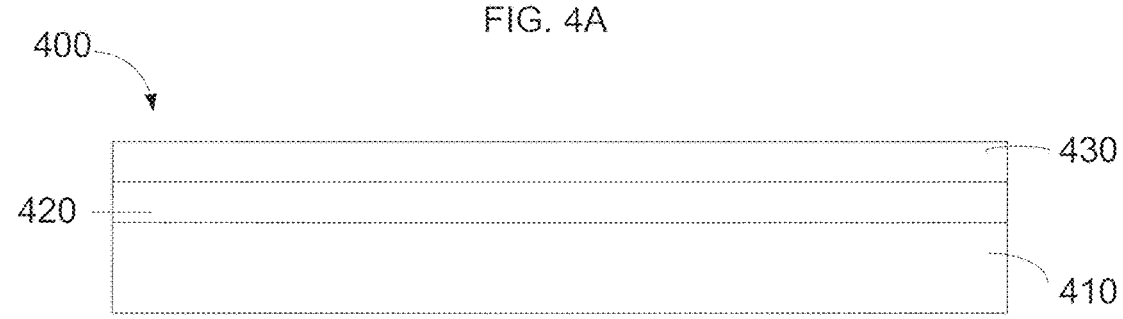
Figure 4C:
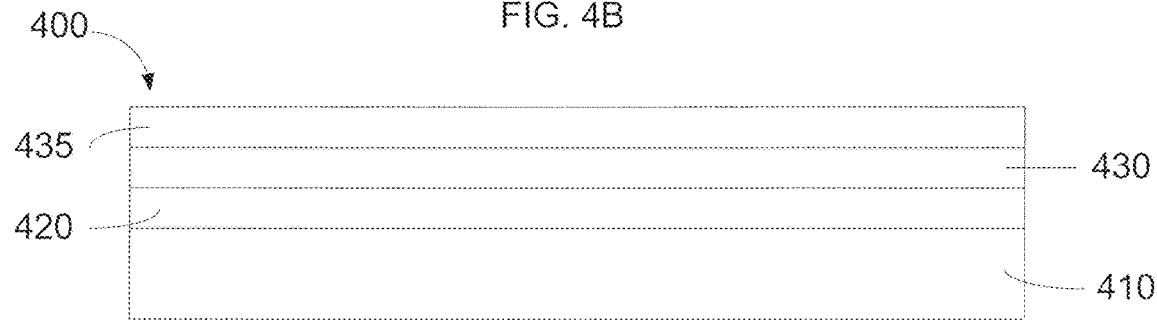
Figure 4D:
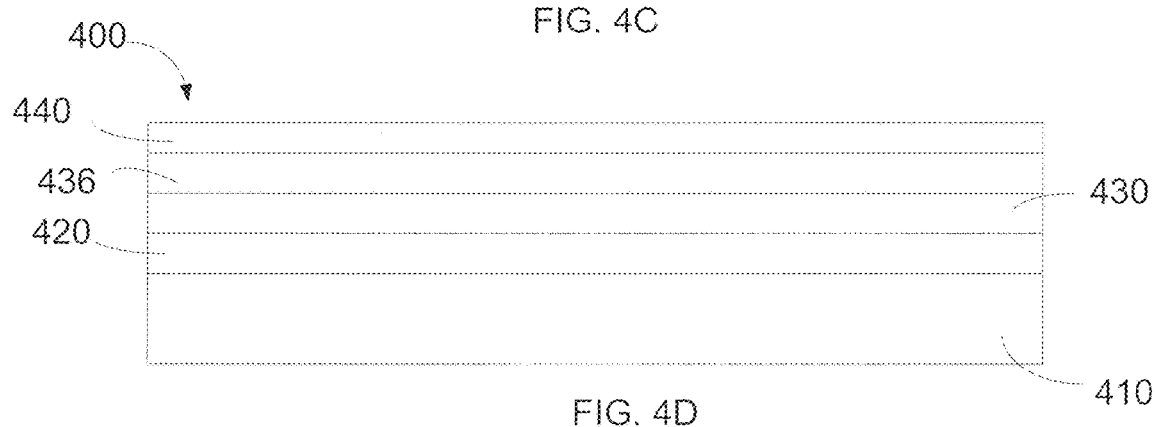
Figure 4E:
Figure 5:
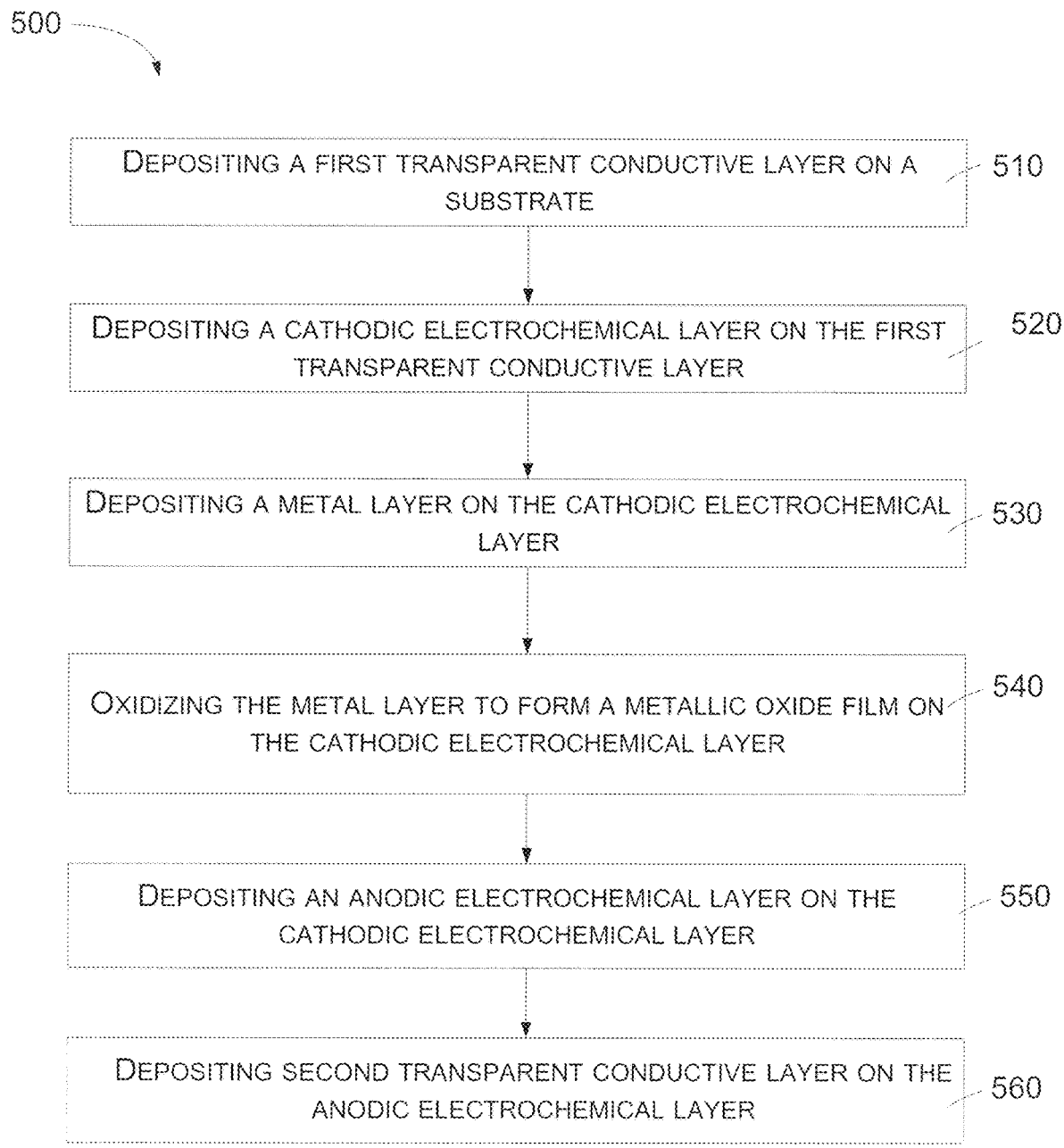
FIG. 5 is a flow chart depicting a process for forming an electrochemical device in accordance with an implementation of the current disclosure.

FIG. 5 is a flow chart depicting a process 500 for forming an electrochromic device in accordance with an implementation of the current disclosure. FIGS. 4A-4E are a schematic cross-section of an electrochromic device 400 at various stages of manufacturing in accordance with an implementation of the present disclosure. The electrochromic device 400 can be the same as the electrochromic devices 200 and 300 described above. The process can include providing a substrate 410. The substrate 410 can be similar to the substrate 210, 310 described above. At operation 510, a first transparent conductive layer 420 can be deposited on the substrate 410, as seen in FIG. 3A. The first transparent conductive layer 420 can be similar to the first transparent conductive layer 220, 320 described above. In one implementation, the deposition of the first transparent conductive layer 420 can be carried out by sputter deposition at a power of between 5 kW and 20 kW, at a temperature between 200° C. and 400° C., in a sputter gas including oxygen and argon at a rate between 0.1 m/min and 0.5 m/min. In one implementation, the sputter gas includes between 40% and 80% oxygen and between 20% and 60% argon. In one implementation, the sputter gas includes 50% oxygen and 50% argon. In one implementation, the temperature of sputter deposition can be between 250° C. and 350° C. In one implementation, the first transparent conductive layer 420 can be carried out by sputter deposition at a power of between 10 kW and 15 kW.

In one implementation, an intermediate layer can be deposited between the substrate 410 and the second transparent conductive layer 220, 320. In an implementation, the intermediate layer can include an insulating layer such as an antireflective layer. The antireflective layer can include a silicon oxide, niobium oxide, or any combination thereof. In a particular implementation, the intermediate layers can be an antireflective layer that can be used to help reduce reflection. The antireflective layer may have an index of refraction between the underlying layers (refractive index of the underlying layers can be approximately 2.0) and clean, dry air or an inert gas, such as Ar or N2 (many gases have refractive indices of approximately 1.0). In an implementation, the antireflective layer may have a refractive index in a range of 1.4 to 1.6. The antireflective layer can include an insulating material having a suitable refractive index. In a particular implementation, the antireflective layer may include silica. The thickness of the antireflective layer can be selected to be thin and provide the sufficient antireflective properties. The thickness for the antireflective layer can depend at least in part on the refractive index of the electrochromic layer 430 and counter electrode layer. The thickness of the intermediate layer can be in a range of 20 nm to 100 nm.

At operation 520 and as seen in FIG. 4B, an electrochromic layer 430 may be deposited on the first transparent conductive layer 420. The electrochromic layer 430 can be similar to the electrochromic layer 230, 330 described above. In one implementation, the deposition of the electrochromic layer 430 may be carried out by sputter deposition of tungsten, at a temperature between 23° C. and 400° C., in a sputter gas including oxygen and argon. In one implementation, the sputter gas includes between 40% and 80% oxygen and between 20% and 60% argon. In one implementation, the sputter gas includes 50% oxygen and 50% argon. In one implementation, the temperature of sputter deposition is between 100° C. and 350° C. In one implementation, the temperature of sputter deposition is between 200° C. and 300° C. An additionally deposition of tungsten may be sputter deposited in a sputter gas that includes 100% oxygen.

At operation 530 and as seen in FIG. 4C, a metal layer 435 may be deposited on the electrochromic layer 430. The metal layer 435 can be similar to the metal layer 235, 335 described above. The metal layer 435 may include lithium, sodium, oxidized lithium, Li2WO4, tungsten, nickel, lithium carbonate, lithium hydroxide, lithium peroxide, or combinations thereof. In one implementation, the deposition of the metal layer 435 may be carried out by sputter deposition at a power of between 5 kW and 12 kW. In one embodiment, the power is pulsed. In another embodiment, the sputter target can be rotated to point away from the substrate. The deposition of the metal may be at a temperature between 23° C. and 500° C. in a sputter gas including oxygen and argon. In one implementation, the temperature of sputter deposition is between 150° C. and 450° C. In another implementation, the deposition of the metal layer 435 may be carried out in a sputter gas including between 0% and 5% oxygen and between 100% to 95% argon. In one implementation, the metal layer 435 may be deposited to form a layer with a thickness between 1 nm and 5 nm. In one implementation, the metal layer may have a thickness of no greater than 5 nm, such as no greater than 4 nm, no greater than 3 nm, no greater than 2 nm, or no greater than 1 nm.

In another implementation, a MOxNy layer may be deposited on the metal layer 435. In another implementation, the MOxNy layer may be deposited on the cathodic electrochromic layer 330. The MOxNy layer can be similar to the MOxNy layer 380. In one implementation, the deposition of the MOxNy layer may be carried out by sputter deposition of silica, lithium, at a temperature between 150° C. and 450° C., in a sputter gas including oxygen and argon. In one implementation, the sputter gas includes between 40% and 80% oxygen and between 20% and 60% argon. In one implementation, the MOxNy layer may be deposited to form a layer with a thickness between 1 nm and 12 nm. In one embodiment, the MOxNy layer may be deposited to form a layer with a thickness between 2 nm and 8 nm. In one implementation, the metal layer may have a thickness of no greater than 12 nm, such as 10 nm, no greater than 5 nm, no greater than as 4 nm, no greater than 3 nm, no greater than 2 nm, or no greater than 1 nm.

At operation 540, the metal layer 435 may be oxidized to form a metallic oxide film 436. The oxidation of the metal layer 435 may be completed before the deposition of any subsequent layers, such as the anodic electrochemical layer 440. In one implementation, the metallic oxide film 436 may be on the cathodic electrochemical layer 430. In another implementation, the metallic oxide film 436 may be on the MOxNy layer. In one embodiment, oxidizing the metal layer to form the metallic oxide film 436 can be carried out after breaking vacuum but before depositing any subsequent layers. In another embodiment, oxidizing the metal layer 435 to form the metallic oxide film 436 can be carried out in an environment including ionized gas. In yet another embodiment, oxidizing the metal layer 435 to form the metallic oxide film 436 can occur in a controlled environment, without vacuum break, but instead by introducing an oxidizing agent into the controlled environment. The ionized agent can include argon, oxygen, nitrogen, oxygen ions, and nitrogen ions, or any combination thereof. Without wishing to be tied to any particular theory, it is believed that prior to formation of overlying layers, the deposited metal layer 435 is oxidized to form various compounds at and along the cathodic electroactive interface. The treatment is understood to modify the metallic rich region in a manner that various performance advantages can be seen, such as a faster switching speed and a richer tinting color as seen below.

In one implementation, the oxidation of the metal layer 435 to form the metallic oxide film 436 may be in conjunction with heating the deposited layers. In one implementation the substrate 410, the first transparent conductive layer 420, the metal layer 435, and the electrochromic layer 430 may be heated at a temperature between 23° C. and 500° C. in atmospheric air for between 1 min. and 30 min. In other words, the substrate and subsequent deposited layers may break vacuum before being heated. In one implementation, the substrate and subsequent layers may be heated in atmospheric air for between 1 min. and 5 min. In one implementation, the metal layer 435 may be oxidized in situ in an oxygen environment using a plasma source. As such, the substrate 410, the first transparent conductive layer 420, the metal layer 435, and the cathodic electrochemical layer 430 may be heated by the plasma source and the metal layer 435 oxidized before subsequent deposition of layers. In one implementation, the substrate 410, the first transparent conductive layer 420, the metal layer 435, and the electrochromic layer 430 may be heated at a temperature between 200° C. and 400° C. In one implementation, the substrate 410, the first transparent conductive layer 420, the metal layer 435, and the electrochromic layer 430 may be heated at a temperature between 300° C. and 380° C.

In yet another implementation, the metal layer 435 may be oxidized to form the metallic film 436 in a low temperature oxidation process. In one implementation, the temperature may be between 23° C. and 100° C. In one implementation, the substrate and subsequent layers can be oxidized in a halogen rich environment. The halogen rich environment can include between 20% and 100% oxygen and 0% to 80% nitrogen. In one implementation, the halogen rich environment can include 100% oxygen. In one implementation, the halogen rich environment can include carbon dioxide.

At operation 550, after oxidization of the metallic film 436, a counter electrode layer 440 may be deposited on the metallic oxide film 436. In one implementation, the counter electrode 440 is deposited on the MOxNy layer. The counter electrode layer 440 can be similar to the counter electrode layer 240, 340 described above. In one implementation, the deposition of the counter electrode layer 440 may be carried out by sputter deposition of tungsten, nickel, and lithium, at a temperature between 20° C. and 50° C., in a sputter gas including oxygen and argon. In one implementation, the sputter gas includes between 60% and 80% oxygen and between 20% and 40% argon. In one implementation, the temperature of sputter deposition is between 22° C. and 32° C.

At operation 560 and as seen in FIG. 4E, a second transparent conductive layer 450 may be deposited on the counter electrode layer 440. The second transparent conductive layer 450 can be similar to the second transparent conductive layer 450 described above. In one implementation, the deposition of the second transparent conductive layer 450 may be carried out by sputter deposition at a power of between 5 kW and 20 kW, at a temperature between 20° C. and 50° C., in a sputter gas including oxygen and argon. In one implementation, the sputter gas includes between 1% and 10% oxygen and between 90% and 99% argon. In one implementation, the sputter gas includes 8% oxygen and 92% argon. In one implementation, the temperature of sputter deposition is between 22° C. and 32° C. In one implementation, the substrate 410, first transparent conductive layer 420, the electrochromic layer 430, the counter electrode layer 440, and the second transparent conductive layer 450 may be heated a at a temperature between 300° C. and 500° C. for between 2 min and 10 min. In one implementation, additional layers may be deposited on the second transparent conductive layer 450.

After depositing the second transparent conductive layer 450, the stack including the substrate 410, the first transparent conductive layer 420, the cathodic electrochemical layer 430, the metallic oxide film 436, the anodic electrochemical layer 440, and the second transparent conductive layer 450 can be heated at a temperature between 300° C. and 700° C. In one implementation, the stack is heated at a temperature between 400° C. and 450° C. In one implementation, the substrate 410, the first transparent conductive layer 420, the cathodic electrochemical layer 430, the metallic oxide film 436, the anodic electrochemical layer 440, and the second transparent conductive layer 450 can be heated at a temperature between 400° C. and 670° C. In one implementation, the stack is heated for a period between 1 min. and 30 mins. In one implementation, the stack is heated for a period between 3 mins. and 5 mins. In one implementation, the stack is heated by laser anneal. In another embodiment, the stack is heated after breaking vacuum.

Any of the electrochemical devices can be subsequently processed as a part of an insulated glass unit. The electrochemical devices' performance, once processed, can be assessed using the switching speed parameter. However, there are several factors that contribute to the switching speed parameter and, dependent upon the size of the device, each factor may be the rate-limiting step. The insulated glass unit can be a window between 10"×10" to a 40"×42". In another embodiment, the insulated glass unit can be a window between 10"×10" to a 20"×22". In one embodiment the insulated glass unit can be a window greater than 10" squared, such as greater than 12" squared, or greater than 15" squared, or greater than 20" squared, or greater than 30" squared, or greater than 35" squared. In another embodiment, the window is rectangular and greater than 10"×12", such as greater than 10"×14", or greater than 12"×14", or greater than 20"×24". The factors that contribute to the switching speed parameter are the through-stack thickness impedance, the transparent conductive oxide layers, and the driving force for lithium ions. In order to further illustrate, a few examples are given below. Each of the factors can be a rate-limiting step dependent upon the size of the electrochemical device. In one embodiment where devices less than 10"×10", the rate limiting step can be the through-stack thickness impedance. The through-stack thickness impedance limits the speed of the lithium ion movement between the stack layers. However, each layer in the stack behaves differently depending on the thickness of each layer in the final electrochemical device. As such, it becomes difficult to pin-point the exact layer causing the most impedance. The inventors have found that by measuring a variety of sizes of electrochemical devices, measuring a varies of aspect ratios, measuring a variety of layer thicknesses, and correlating the data to a physics based model, the impedance signals can be shown as a function of frequency to each layer of the stack. By determining the frequency to each layer of the stack, it can be determined which layer is causing the most impedance. As such, the amount of deposition time can be adjusted as each layer is deposited during the process described above to increase the switching speed.

In one embodiment where devices are greater than 10"×10", the rate limiting step can be the transparent conductive oxide (TCO) layers. Each TCO layer can be made of different material which leads to different resistive properties. In, for example, devices where the bus bars are spaced at the edge of the device and the device is greater than 10" wide, the electronic conduction through the transparent conducting oxide layers can be the rate limiting step for the switching speed parameter. Accordingly, the switching speed parameter can be slower in electrochemical devices with larger bus bar spacing, as seen for example in devices greater than 10". In other words, there is an inverse property between the bus bar spacing and the switching speed parameter; as the bus bar spacing increases the switching speed decreases. However, by depositing the TCOs as noted above, the inventors have been able to reduce the resistance in the TCO layers and increase the switching speed parameter.

Additionally, the applied voltage to the electrochemical device can determine the driving force for lithium ions as they move from one layer to the other. At rest, the lithium ions mostly reside in the counter electrode layer, where the lithium ions have a lower potential energy than when in the electrochemical layer, with an activation barrier impeding them from moving in the electrochromic layer. An applied voltage changes the relative potential energy of the counter electrode layer and the electrochromic layer, and also the activation barrier height, such that the lithium ions move from the counter electrode layer to the electrochemical layer. The higher the voltage, the faster the activation barrier can be overcome and the faster the lithium ions can move to the electrochromic layer thus improving the switching speed parameter of the device. However, if the voltage is too high, the voltage can damage the material in the layers and introduce an electronic leakage current. As such, the driving force or applied voltage has to be adjusted according the thicknesses of each layer. For the devices described herein, a voltage between −5V and +5V can be used.

Figure 9:
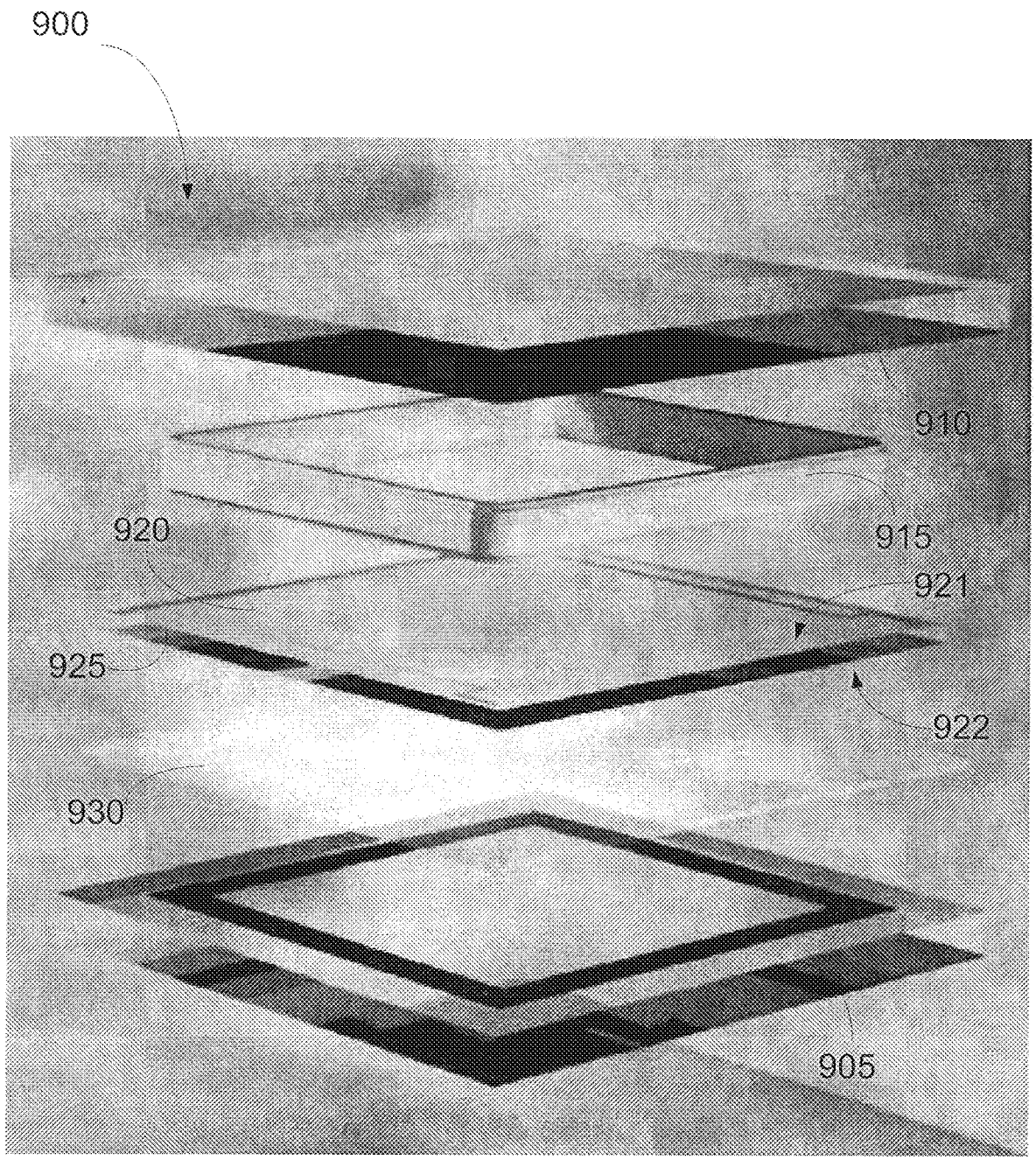
FIG. 9 is a schematic illustration of an insulated glazing unit according to an implementation of the current disclosure.

FIG. 9 is a schematic illustration of an insulated glazing unit 900 according the implementation of the current disclosure. The insulated glass unit 900 can include a first panel 905, an electrochemical device 920 coupled to the first panel, a second panel 910, and a spacer 915 between the first panel 905 and second panel 910. The first panel 905 can be a glass panel, a sapphire panel, an aluminum oxynitride panel, or a spinel panel. In another implementation, the first panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The first panel 905 may or may not be flexible. In a particular implementation, the first panel 905 can be float glass or a borosilicate glass and have a thickness in a range of 2 mm to 20 mm thick. The first panel 905 can be a heat-treated, heat-strengthened, or tempered panel. In one implementation, the electrochemical device 920 is coupled to first panel 905. In another implementation, the electrochemical device 920 is on a substrate 925 and the substrate 925 is coupled to the first panel 905. In one implementation, a lamination interlayer 930 may be disposed between the first panel 905 and the electrochemical device 920. In one implementation, the lamination interlayer 930 may be disposed between the first panel 905 and the substrate 925 containing the electrochemical device 920. The electrochemical device 920 may be on a first side 921 of the substrate 925 and the lamination interlayer 930 may be coupled to a second side 922 of the substrate. The first side 921 may be parallel to and opposite from the second side 922.

The second panel 910 can be a glass panel, a sapphire panel, an aluminum oxynitride panel, or a spinel panel. In another implementation, the second panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The second panel may or may not be flexible. In a particular implementation, the second panel 910 can be float glass or a borosilicate glass and have a thickness in a range of 5 mm to 30 mm thick. The second panel 910 can be a heat-treated, heat-strengthened, or tempered panel. In one embodiment, the spacer 915 can be between the first panel 905 and the second panel 910. In another embodiment, the spacer 915 is between the substrate 925 and the second panel 910. In yet another embodiment, the spacer 915 is between the electrochemical device 920 and the second panel 910.

In another implementation, the insulated glass unit 900 can further include additional layers. The insulated glass unit 900 can include the first panel, the electrochemical device 920 coupled to the first panel 905, the second panel 910, the spacer 915 between the first panel 905 and second panel 910, a third panel, and a second spacer between the first panel 905 and the second panel 910. In one implementation, the electrochemical device may be on a substrate. The substrate may be coupled to the first panel using a lamination interlayer. A first spacer may be between the substrate and the third panel. In one implementation, the substrate is coupled to the first panel on one side and spaced apart from the third panel on the other side. In other words, the first spacer may be between the electrochemical device and the third panel. A second spacer may be between the third panel and the second panel. In such an embodiment, the third panel is between the first spacer and second spacer. In other words, the third panel is couple to the first spacer on a first side and coupled to the second spacer on a second side opposite the first side.

The implementations described above and illustrated in the figures are not limited to rectangular shaped devices. Rather, the descriptions and figures are meant only to depict cross-sectional views of a device and are not meant to limit the shape of such a device in any manner. For example, the device may be formed in shapes other than rectangles (e.g., triangles, circles, arcuate structures, etc.). For further example, the device may be shaped three-dimensionally (e.g., convex, concave, etc.).

Many different aspects and implementations are possible. Some of those aspects and implementations are described below. After reading this specification, skilled artisans will appreciate that those aspects and implementations are only illustrative and do not limit the scope of the present invention. Exemplary implementations may be in accordance with any one or more of the ones as listed below.

Implementation 1. An electrochemical device including a first transparent conductive layer, a cathodic electrochemical layer overlying the first transparent conductive layer, an anodic electrochemical layer overlying the cathodic electrochemical layer, a second transparent conductive layer, and a switching speed parameter of not greater than 0.68 s/mm, such as 0.6, no greater than 0.5, or no greater than 0.4 at 23° C.

Implementation 2. An electrochemical device including a first transparent conductive layer, a cathodic electrochemical layer overlying the first transparent conductive layer, an anodic electrochemical layer overlying the cathodic electrochemical layer, a second transparent conductive layer, and a switching speed parameter of a switching speed parameter of not greater than 1.0 s/mm, such as 0.9 s/mm, no greater than 0.8 s/mm, or no greater than 0.7 s/mm at −20° C.

Implementation 3. An electrochemical device including a first transparent conductive layer, a cathodic electrochemical layer overlying the first transparent conductive layer, an anodic electrochemical layer overlying the cathodic electrochemical layer, a second transparent conductive layer, and an impedance parameter of log|Z| of less than 1.5/log (ohm), such as less than 1.2/log (ohm), or less than 1/log (ohm).

Implementation 4. An electrochemical device including a first transparent conductive layer, a cathodic electrochemical layer overlying the first transparent conductive layer, an anodic electrochemical layer overlying the cathodic electrochemical layer, a second transparent conductive layer, and a shadowing parameter of less than 2.5 L*, such as 2.4 L*, less than 2.3 L*, less than 2.2 L*, less than 2.1 L*, less than 1.9 L*, less than 1.8 L*, less than 1.7 L*, less than 1.6 L*, less than 1.5 L*, less than 1.4 L*, less than 1.3 L*, less than 1.2 L*, or less than 1.1 L* at 8 min.

Implementation 5. An insulated glazing unit including a first panel an electrochemical device coupled to the first panel. The electrochemical device including a first transparent conductive layer, a cathodic electrochemical layer overlying the first transparent conductive layer, an anodic electrochemical layer overlying the cathodic electrochemical layer, and a second transparent conductive layer. The insulated glazing unit also including a second panel, a spacer frame disposed between the first panel and the second panel, and a tinted transmission parameter of less than 8%, such as less than 7%, less than 6%, less than 5%, less than 4% less than 3% at −20° C.

Implementation 6. The electrochemical device of any one of implementations 1 to 4, further comprising a substrate, wherein the first transparent conductive layer is on the substrate.

Implementation 7. The electrochemical device or insulated glazing unit of any one of implementations 5 or 6, wherein the substrate comprises glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Implementation 8. The electrochemical device or insulated glazing unit of any one of implementations 1 to 5, further comprising a metallic oxide film between the cathodic electrochemical layer and the anodic electrochemical layer.

Implementation 9. The electrochemical device or insulated glazing unit of any one of implementations 1 to 5, wherein the cathodic electrochemical layer comprises an electrochromic material.

Implementation 10. The electrochemical device or insulated glazing unit of implementation 9, wherein the electrochromic material comprises $WO_3$, $V_2O_5$, $MoO_3$, $Nb_2O_5$, $TiO_2$, CuO, $Ni_2O_3$, NiO, $Ir_2O_3$, $Cr_2O_3$, $CO_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

Implementation 11. The electrochemical device or insulated glazing unit of any one of implementations 1 to 5, further comprising a metallic oxide film between the counter electrode layer and the electrochromic layer.

Implementation 12. The electrochemical device or insulated glazing unit of implementation 11, wherein the metallic oxide film comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or any combination thereof.

Implementation 13. The electrochemical device or insulated glazing unit of implementation 8, wherein the metallic oxide film does not comprise a polymer.

Implementation 14. The electrochemical device or insulated glazing unit of any one of implementations 1 to 5, further comprising a MOxNy layer between the cathodic electrochemical layer and the anodic electrochemical layer, M is a metal, x is between 0.1-6, and y is between 0.1-6.

Implementation 15. The electrochemical device or insulated glazing unit of implementation 14, wherein the metal comprises silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, other lithium-based ceramic materials, lithium salts, and dopants including lithium, sodium, hydrogen, deuterium, potassium, calcium, barium, strontium, magnesium, or combinations thereof.

Implementation 16. The electrochemical device or insulated glazing unit of any one of implementations 1 to 5, wherein the MOxNy layer has a thickness of no greater than 10 nm, such as 5 nm, no greater than as 4 nm, no greater than 3 nm, no greater than 2 nm, or no greater than 1 nm.

Implementation 17. The electrochemical device or insulated glazing unit of any one of implementations 1 to 5, wherein the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum and any combination thereof.

Implementation 18. The electrochemical device or insulated glazing unit of any one of implementations 1 to 5, wherein the second transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Implementation 19. The electrochemical device or insulated glazing unit of any one of implementations 1 to 5, wherein the anodic electrochemical layer comprises a an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

Implementation 20. The electrochemical device or insulated glazing unit of any one of implementations 1 to 5, wherein the second transparent conductive layer comprises a thickness between 10 nm to about 600 nm.

Implementation 21. The electrochemical device or insulated glazing unit of any one of implementations 1 to 5, wherein the first transparent conductive layer comprises a thickness between 10 nm to about 600 nm.

Implementation 22. The electrochemical device or insulated glazing unit of any one of implementations 1 to 5, wherein the cathodic electrochemical layer comprises a thickness between 40 nm to about 600 nm.

Implementation 23. The electrochemical device or insulated glazing unit of any one of implementations 1 to 5, wherein the anodic electrochemical layer comprises a thickness between 40 nm to about 500 nm.

Implementation 24. The electrochemical device or insulated glazing unit of implementation 11, wherein the metallic oxide film has a thickness of no greater than 10 nm, such as 5 nm, no greater than 4 nm, no greater than 3 nm, no greater than 2 nm, or no greater than 1 nm.

Implementation 25. The electrochemical device or insulated glazing unit of any one of implementations 5 or 6, wherein the substrate has a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm.

Implementation 26. The electrochemical device or insulated glazing unit of any one of implementations 1 to 5, further comprising a SiOx:Al layer between the cathodic electrochemical layer and the anodic electrochemical layer.

Implementation 27. The electrochemical device or insulated glazing unit of any one of implementations 5 or 6, further comprising a first panel coupled to the substrate and a lamination layer between the substrate and the first panel.

Implementation 28. The electrochemical device of any one of implementations 1 to 4, further comprising a second panel coupled to the first panel.

Implementation 29. The electrochemical device of implementation 28, further comprising a spacer frame disposed between the first panel and the second panel.

Implementation 30. The electrochemical device or insulated glazing unit of any one of implementations 1 to 5, further comprising a lamination interlayer.

Implementation 31. The electrochemical device or insulated glazing unit of implementation 30, wherein the lamination interlayer is between the first panel and the electrochemical device.

Implementation 32. The electrochemical device or insulated glazing unit of any one of implementations 1 to 5, further comprising a protective layer over the second transparent conductive layer.

Implementation 33. The electrochemical device or insulated glazing unit of any one of implementations 5 or 28, further comprising a third panel and a second spacer frame, wherein the thirds panel and the second spacer frame are disposed between the second panel and the electrochemical device.

Implementation 34. The electrochemical device or insulated glazing unit of any one of implementations 1 to 5, wherein the electrochemical device is a variable transmission device.

Implementation 35. The electrochemical device or insulated glazing unit of any one of implementations 1 to 5, wherein the electrochemical device is a thin-film battery.

Implementation 36. A method of forming an electrochemical device including (a) providing a substrate, (b) depositing a first transparent conductive layer on the substrate, (c) depositing a cathodic electrochemical layer on the first conductive layer, (d) depositing a metal layer on the cathodic electrochemical layer, (e) oxidizing the metal layer to form an metallic oxide film on the cathodic electrochemical layer, (f) depositing an anodic electrochemical layer on the cathodic electrochemical layer, and (g) depositing a second transparent conductive layer on the counter electrode layer.

Implementation 37. The method of implementation 36, further including heating the substrate, first transparent conductive layer, cathodic electrochemical layer, and metallic oxide film at a temperature between 23° C. and 500° C. before depositing the anodic electrochemical layer.

Implementation 38. The method of implementation 36, further including depositing a MOxNy layer on the metallic oxide film before oxidizing the metal layer to form the metallic oxide film, wherein M is a metal, x is between 0.1-6, and y is between 0.1-6.

Implementation 39. The method of implementation 36, wherein the cathodic electrochemical layer comprises an electrochromic material.

Implementation 40. The method of implementation 39, wherein the electrochromic material comprises $WO_3$, $V_2O_5$, $MoO_3$, $Nb_2O_5$, $TiO_2$, $CuO$, $Ni_2O_3$, $Ir_2O_3$, $Cr_2O_3$, $CO_2O_3$, $Mn_2O_3$, mixed oxides (e.g., W—Mo oxide, W—V oxide), lithium, aluminum, zirconium, phosphorus, boron, a borate with or without lithium, a tantalum oxide with or without lithium, a lanthanide-based material with or without lithium, another lithium-based ceramic material, or any combination thereof.

Implementation 41. The method of implementation 36, wherein depositing the cathodic electrochemical layer on the first conductive layer is carried out by sputter deposition of tungsten.

Implementation 42. The method of implementation 41, wherein depositing the cathodic electrochemical layer on the first conductive layer is carried out in a sputter gas comprising between 40% and 80% oxygen and between 20% to 60% argon at a temperature between 23° C. and 450° C.

Implementation 43. The method of implementation 36, wherein depositing the metal the metal layer on the cathodic electrochemical layer is carried out by sputter deposition.

Implementation 44. The method of implementation 36, wherein depositing the metal layer on the cathodic electrochemical layer is carried out by sputter deposition after turning a target away from the substrate.

Implementation 45. The method of implementation 44, wherein depositing the metal layer on the cathodic electrochemical layer is carried out in a sputter gas comprising between 0% and 5% oxygen and between 100% to 95% argon at a temperature between 23° C. and 500° C.

Implementation 46. The method of implementation 36, wherein the metal layer comprises lithium, sodium, oxidized lithium, $Li_2WO_4$, tungsten, nickel, lithium carbonate, lithium hydroxide, lithium peroxide, or combinations thereof.

Implementation 47. The method of implementation 36, wherein the metal layer comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or any combination thereof.

Implementation 48. The method of implementation 36, wherein none of the first transparent conductive layer, the cathodic electrochemical layer, the anodic electrochemical layer, the second transparent conductive layer, and the metallic oxide film comprise a polymer.

Implementation 49. The method of implementation 36, wherein the metal layer has a thickness of no greater than 10 nm, such as 5 nm, no greater than 4 nm, no greater than 3 nm, no greater than 2 nm, or no greater than 1 nm.

Implementation 50. The method of implementation 38, wherein the MOxNy layer has a thickness of no greater than no greater than 10 nm, such as 5 nm, no greater than as 4 nm, no greater than 3 nm, no greater than 2 nm, or no greater than 1 nm.

Implementation 51. The method of implementation 36, further including heating the substrate, first transparent conductive layer, cathodic electrochemical layer, metallic oxide film, anodic electrochemical layer, and second transparent conductive layer at a temperature between 23° C. and 500° C.

Implementation 52. The method of implementation 36, wherein the electrochemical device comprises a switching speed parameter of not greater than 0.58 s/mm at 23° C.

Implementation 53. The method of implementation 36, wherein the electrochemical device comprises a switching speed parameter of not greater than 1.1 s/mm at −20° C.

Implementation 54. The method of implementation 36, wherein the electrochemical device comprises an impedance parameter of log|Z| of less than 1.5/log (ohm), such as less than 1.2/log (ohm), or less than 1/log (ohm).

Implementation 55. The method of implementation 37, wherein heating the substrate, first transparent conductive layer, cathodic electrochemical layer, and metallic oxide film is in atmospheric air for between 1 min. and 30 min.

Implementation 56. The method of implementation 37, wherein heating the substrate, first transparent conductive layer, cathodic electrochemical layer, and metallic oxide film is in between 20% and 100% oxygen and 0% to 80% nitrogen for between 1 min. and 30 min.

Implementation 57. The method of implementation 37, wherein heating the substrate, first transparent conductive layer, cathodic electrochemical layer, and metallic oxide film is at a temperature between 200° C. and 500° C.

Implementation 58. The method of implementation 37, wherein heating the substrate, first transparent conductive layer, cathodic electrochemical layer, and metallic oxide film is at a temperature between 250° C. and 500° C.

Implementation 59. The method of implementation 48, wherein depositing the anodic electrochemical layer on the second conductive layer is carried out by sputter deposition.

Implementation 60. The method of implementation 48, wherein the depositing the anodic electrochemical layer on the second conductive layer is carried out by sputter deposition of tungsten, nickel, and lithium.

Implementation 61. The method of implementation 48, wherein depositing the anodic electrochemical layer on the first conductive layer is carried out in a sputter gas comprising between 80% and 100% oxygen at a temperature between 20° C. and 50° C.

Implementation 62. The method of implementation 36, wherein depositing a first transparent conductive layer on the substrate is at a temperature between 200° C. and 500° C.

Implementation 63. The method of implementation 36, wherein depositing a second transparent conductive layer on the anodic electrochemical layer is at a temperature between 200° C. and 500° C.

Implementation 64. The method of implementation 36, wherein the substrate comprises glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Implementation 65. The method of implementation 36, wherein the substrate has a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm.

Implementation 66. The method of implementation 36, wherein the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Implementation 67. The method of implementation 36, wherein the first transparent conductive layer comprises a thickness between 10 nm to about 600 nm.

Implementation 68. The method of implementation 36, wherein the cathodic electrochemical layer comprises a thickness between 40 nm to about 600 nm.

Implementation 69. The method of implementation 36, wherein the anodic electrochemical layer comprises a an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $CO_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

Implementation 70. The method of implementation 36, wherein the second transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Implementation 71. The method of implementation 36, wherein the second transparent conductive layer comprises a thickness between 10 nm to about 600 nm.

Implementation 72. The method of implementation 38, wherein the ceramic material comprises silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, other lithium-based ceramic materials, lithium salts, and dopants including lithium, sodium, hydrogen, deuterium, potassium, calcium, barium, strontium, magnesium, and combinations thereof.

Implementation 73. The method of implementation 36, further including coupling a first panel to the electrochemical device, wherein the first panel is coupled to the electrochemical device using a lamination layer, coupling a second panel to the first panel, and placing spacer frame between the first panel and the second panel.

Implementation 74. The method of implementation 73, further including coupling the electrochemical device to a third panel, wherein the third panel is coupled to the electrochemical device, and placing a second spacer frame between the second panel and the electrochemical device.

Implementation 75. The method of implementation 36, further comprising depositing an antireflective layer on the substrate before depositing the first transparent conductive layer.

Implementation 76. The method of implementation 75, wherein the antireflective layer comprises silica oxide and niobium oxide.

Implementation 77. The method of implementation 36, wherein the anodic electrochemical layer comprises a thickness between 40 nm to about 500 nm.

Implementation 78. The method of implementation 36, wherein oxidizing the metal layer to form the metallic oxide film on the cathodic electrochemical layer is within a controlled environment using an ionizing agent, wherein the ionizing agent comprises oxygen, nitrogen, and argon.

Implementation 79. The method of implementation 36, further including heating the substrate, first transparent conductive layer, cathodic electrochemical layer, metallic oxide film, anodic electrochemical layer, and second transparent conductive layer at a temperature between 400° C. and 670° C.

EXAMPLES

An example is provided to demonstrate the performance of an electrochemical device with a metallic oxide film as compared to other electrochemical devices with varying layers. For the various examples below, sample 1 (S1) was formed in accordance to the various embodiments described above. Comparative sample, Sample 2 (S2) is understood to be an embodiment without an ion-conducting layer, as described in U.S. Pat. Nos. 8,758,575, 8,582,193, and 9,261,751. Comparative sample, Sample 3 (S3) is understood to be an embodiment with an ion-conducting layer, as described in U.S. Pat. No. 9,581,875.

Figure 6:
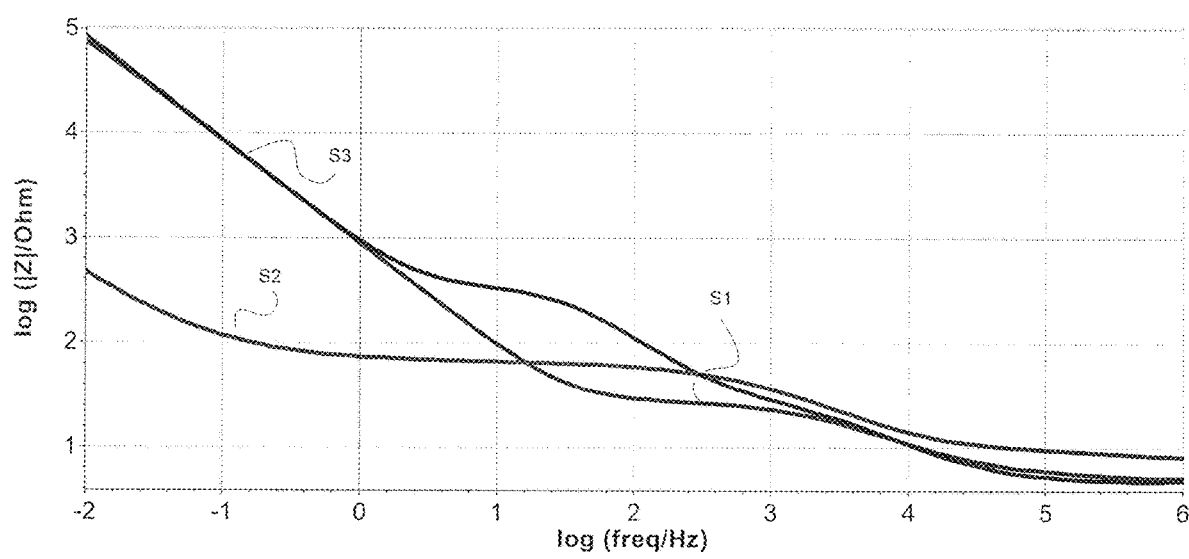
FIG. 6 is a schematic graph of the impedance of various electrochemical devices.

FIG. 6 is a modulus graph of the impedance of various samples S1, S2, and S3. As can be seen in FIG. 6, impedance is the absolute value of Z. The y-axis is however, the phase angle at each frequency in the range of 100 MHz to 6 MHz. The x-axis is the log of Z in −20° C. in the frequency range of 101-106 Hz. At a parameter of 2, S1 has an impedance parameter of log|Z| of less than 1.5/log (ohm), such as less than 1.2/log (ohm), or less than 1/log (ohm). At the parameter of 2, S2 and S3 have an impedance of greater than 1.5/log (ohm).

Figure 7:
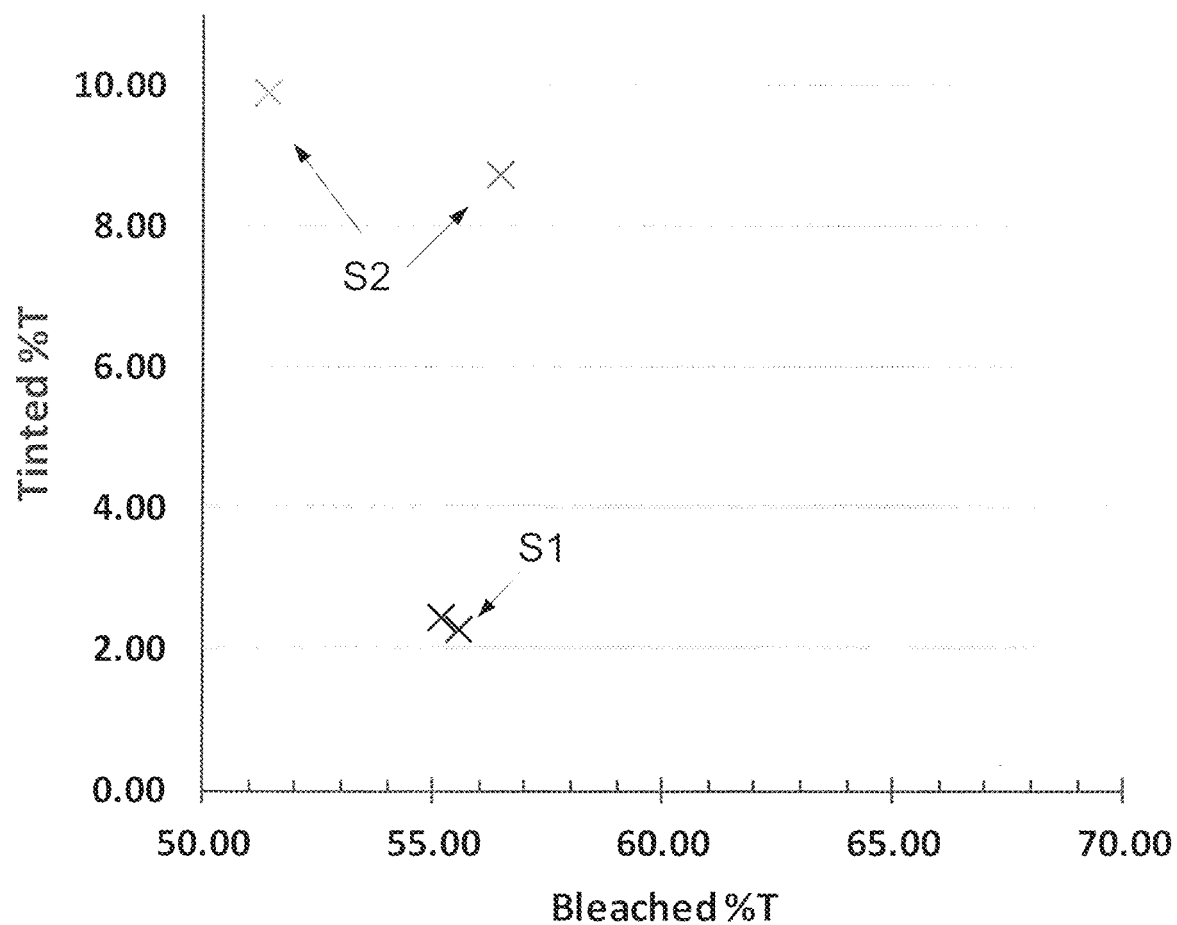
FIG. 7 is a schematic graph of the tinting states of various electrochemical devices.

FIG. 7 is a schematic graph of the tinting states of the various samples S1, S2. The y-axis is the tinted percentage and the x-axis is the bleached percentage at −20° C. S1 has a tinted transmission parameter of less than 8%, such as less than 7%, less than 6%, less than 5%, less than 4%, or less than 3%.

Figure 8:
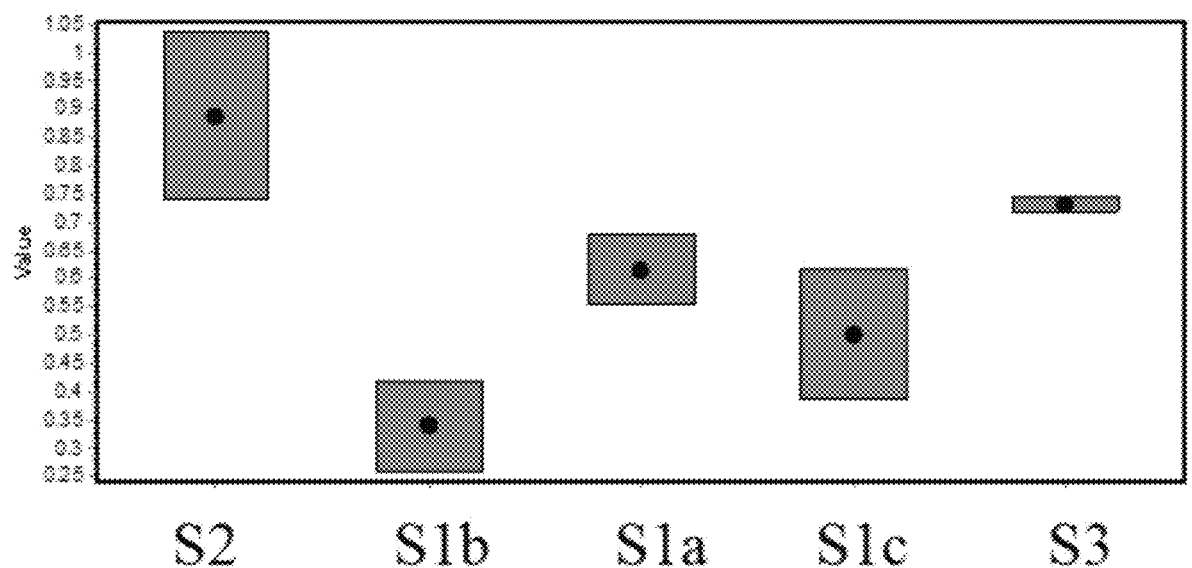
FIG. 8 is a schematic graph of the switching speeds of various electrochemical devices.

FIG. 8 is a schematic graph of the switching speeds of various samples S1 (a, b, and c), S2, and S3. FIG. 8 shows the 95% confidence interval of switching speed s/mm at 23° C. Below is Table 1 with the data from the graph of FIG. 8.

|  | Mean | Std Dev | Low | High |
|---|---|---|---|---|
| Sample 1a (S1a) | 0.61 | 0.07 | 0.45 | 0.73 |
| Sample 1b (S1b) | 0.34 | 0.05 | 0.28 | 0.41 |
| Sample 1c (S1c) | 0.5 | .15 | .45 | .65 |
| Sample 2 (S2) | 0.89 | 0.13 | 0.76 | 1.02 |
| Sample 3 (S3) | 0.73 | 0.20 | 0.75 | 1.28 |

S2 has an average switching speed of 0.89 s/mm, with the lowest switching speed of 0.76 s/mm. S1a has an average switching speed of 0.61 s/mm, with the highest switching speed of 0.73 s/mm. S1a can be the same as S1 above. S1b has an average switching speed of 0.34 s/mm, with the lowest switching speed of 0.28 s/mm. S1c has an average switching speed of 0.5 s/mm, with the highest switching speed of 0.65 s/mm. S3 has an average switching speed of 0.73 s/mm, with the lowest switching speed of 0.75 s/mm. Switching speed changes with temperature. Below is Table 2 with data of switching speed s/mm of S1 and S2 at −20° C.

|  | Mean | Low | High |
|---|---|---|---|
| Sample 1 (S1) | 0.72 | 0.72 | 0.72 |
| Sample 2 (S2) | 1.22 | 1.1 | 1.38 |

S1 can have an average switching speed of 0.72 s/mm. S2 has an average switching speed of 1.22 s/mm, with the lowest switching speed of 1.1 s/mm. S1 can have a switching speed parameter of not greater than 1.0 s/mm, such as 0.9 s/mm, no greater than 0.8 s/mm, or no greater than 0.7 s/mm at −20° C.

Figure 10:
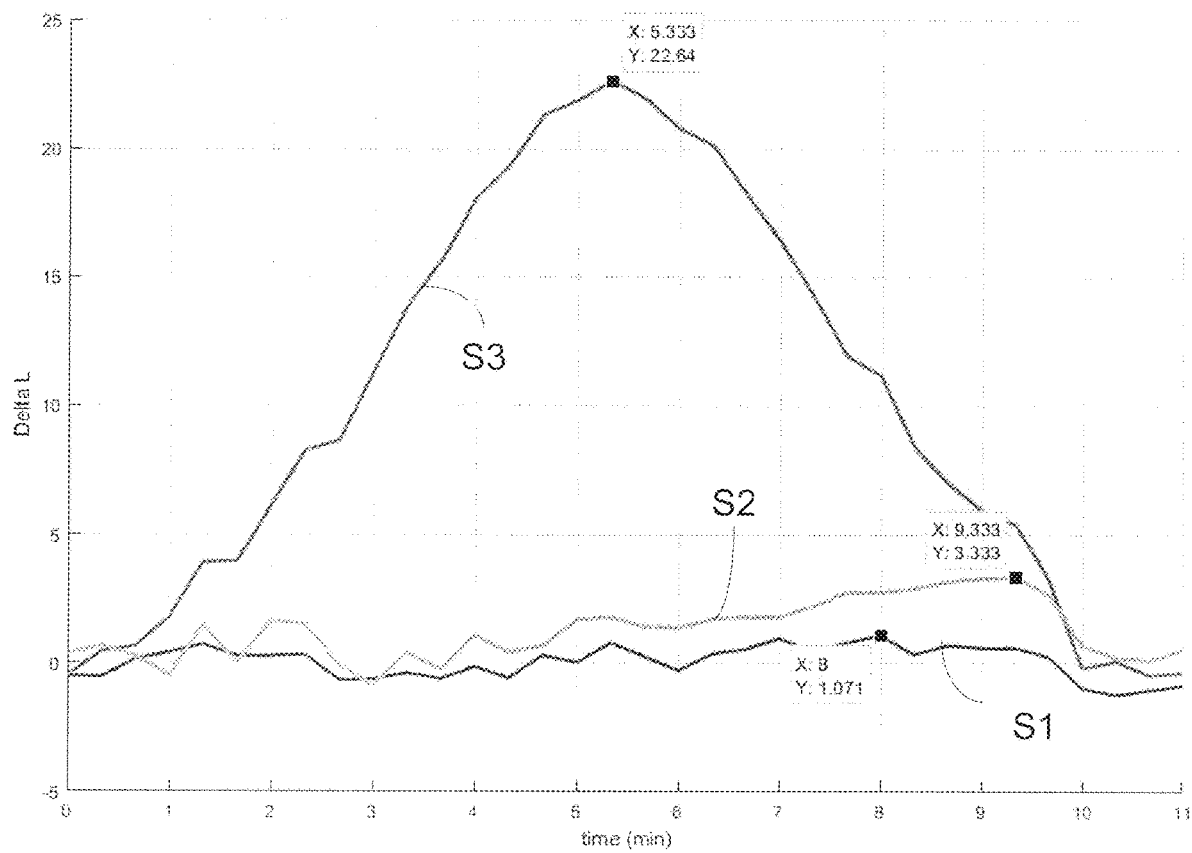
FIG. 10 is a schematic graph of the shadowing effects of various electrochemical devices.

FIG. 10 is a schematic graph of the shadowing effects of various electrochemical devices, S1, S2, and S3 as measured by the change in brightness between an area in the sun and an area in a shadow over a period of ten minutes. Delta L is the difference in brightness between the area in the sun and the area in the shadow. As can be seen, S1 has a delta L of less than 2.5 L*, such as 2.4 L*, less than 2.3 L*, less than 2.2 L*, less than 2.1 L*, less than 1.9 L*, less than 1.8 L*, less than 1.7 L*, less than 1.6 L*, less than 1.5 L*, less than 1.4 L*, less than 1.3 L*, less than 1.2 L*, or less than 1.1 L*at 8 min. S2 and S3 have a delta L above 3.

Figure 12:
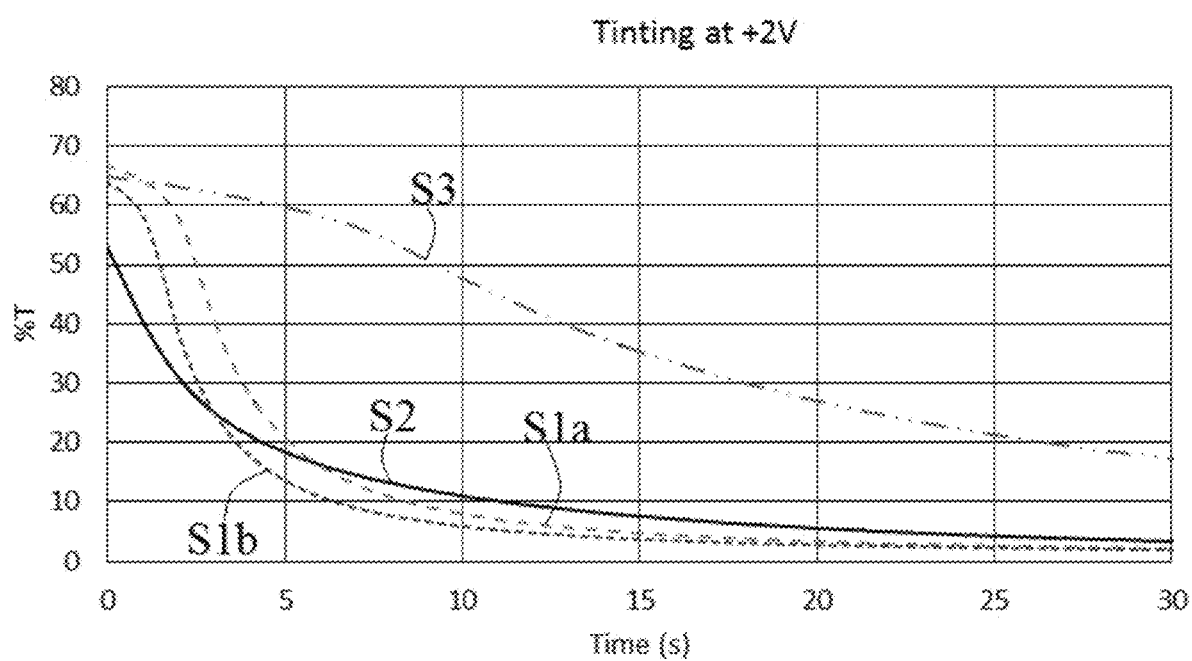
FIG. 12 is a schematic graph of the switching speeds of various electrochemical devices.

FIG. 12 is a schematic graph of the switching speeds of various samples S1 (a and b), S2, and S3. FIG. 12 shows time in seconds it takes a 5×5 cm pixel to go from 50% transmission (T) to 5% T. Each device had electrical contacts applied to the top and bottom ITO with copper tape and ultrasonic solder. A white LED and light detector measured the % TL from a clear state. +2V were applied to the pixel for 10 minutes and the % T measured simultaneously. Below is Table 3 with the data from the graph of FIG. 12.

|  | Time (seconds) |
|---|---|
| Sample 1a (S1a) | 11.9 |
| Sample 1b (S1b) | 10.1 |
| Sample 2 (S2) | 21.6 |
| Sample 3 (S3) | 70.3 |

As seem in both Table 3 and FIG. 12, S1 has a faster switching speed than S2 and S3. S1a goes from 50% T to 5% T in 11.9 seconds. S1b goes from 50% T to 5% T in 10.1 seconds. S2 goes from 50% T to 5% T in 21.6 seconds. S3 goes from 50% T to 5% T in 70.3 seconds.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate implementations, may also be provided in combination in a single implementation. Conversely, various features that are, for brevity, described in the context of a single implementation, may also be provided separately or in any subcombination. Further, reference to values stated in ranges includes each and every value within that range.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims.

The specification and illustrations of the implementations described herein are intended to provide a general understanding of the structure of the various implementations. The specification and illustrations are not intended to serve as an exhaustive and comprehensive description of all of the elements and features of apparatus and systems that use the structures or methods described herein. Separate implementations may also be provided in combination in a single implementation, and conversely, various features that are, for brevity, described in the context of a single implementation, may also be provided separately or in any subcombination. Further, reference to values stated in ranges includes each and every value within that range. Many other implementations may be apparent to skilled artisans only after reading this specification. Other implementations may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochemical device comprising:
   a first transparent conductive layer;
   a cathodic electrochemical layer overlying the first transparent conductive layer;
   a MOxNy layer between the cathodic electrochemical layer and the anodic electrochemical layer, wherein M is a metal, x is between 0.1-6, and y is between 0.1-6;
   an anodic electrochemical layer overlying the cathodic electrochemical layer; and
   a second transparent conductive layer, wherein a switching speed parameter for the electrochemical device is not greater than 0.4 s/mm at 23° C., and wherein a shadowing parameter for the electrochemical device is less than 2.5L*.

2. The electrochemical device of claim 1, wherein the MOxNy layer has a thickness of no greater than 10nm.

3. The electrochemical device of claim 1, further comprising a SiOx:Al layer between the cathodic electrochemical layer and the anodic electrochemical layer.

4. The electrochemical device of claim 1, further comprising
   a substrate, wherein the first transparent conductive layer is on the substrate;
   a first panel coupled to the substrate; and
   a lamination layer between the substrate and the first panel.

5. The electrochemical device of claim 4, further comprising a second panel coupled to the first panel.

6. The electrochemical device of claim 1, further comprising a metallic oxide file, wherein the metallic oxide film comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or any combination thereof.

7. The electrochemical device of claim 6, wherein the metallic oxide film does not comprise a polymer.

8. The electrochemical device of claim 1, wherein the cathodic electrochemical layer comprises an electrochromic material.

9. The electrochemical device of claim 8, wherein the electrochromic material comprises $WO_3$, $V_2O_5$, $MoO_3$, $Nb_2O_5$, $TiO_2$, CuO, $Ni_2O_3$, NiO, $Ir_2O_3$, $Cr_2O_3$, $Co_2O_3$, $Mn_2O_3$, mixed oxides(e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

10. The electrochemical device of claim 1, wherein a second switching speed parameter for the electrochemical device is not greater than 1.0 s/mm at −20° C.

11. The electrochemical device of claim 1, wherein the metal comprises an alkaline earth metal, transition metal, Zn, Ga, Ge, Al, Cd, In, Sn, Sb, Pb, Bi, B, Si, P, S, As, Se, Te, silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, other lithium-based ceramic materials, lithium salts, and dopants including lithium, sodium, hydrogen, deuterium, potassium, calcium, barium, strontium, magnesium, or combinations thereof.

12. An electrochemical device comprising:
   a first transparent conductive layer;
   a cathodic electrochemical layer overlying the first transparent conductive layer;
   an anodic electrochemical layer overlying the cathodic electrochemical layer; and
   a second transparent conductive layer, wherein a second switching speed parameter for the electrochemical device is not greater than 1.0 s/mm at −20° C.

13. The electrochemical device of claim 12, further comprising a metallic oxide film between the cathodic electrochemical layer and the anodic electrochemical layer.

14. The electrochemical device of claim 13, wherein the metallic oxide film comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or any combination thereof.

15. The electrochemical device of claim 13, wherein the metallic oxide film has a thickness greater than zero and no greater than 10nm.

16. An electrochemical device comprising:
   a first transparent conductive layer;
   a cathodic electrochemical layer overlying the first transparent conductive layer;
   an anodic electrochemical layer overlying the cathodic electrochemical layer;
   a SiOx:Al layer between the cathodic electrochemical layer and the anodic electrochemcial layer; and
   a second transparent conductive layer, wherein the electrochemical device has a tinted transmission parameter of less than 8% at −20° C.

17. The electrochemical device of claim 16, further comprising a metallic oxide film between the cathodic electrochemical layer and the anodic electrochemical layer.

18. The electrochemical device of claim 17, wherein the metallic oxide film has a thickness of no greater than 1nm.

* * * * *